United States Patent
Kawase et al.

[11] Patent Number: 6,072,026
[45] Date of Patent: Jun. 6, 2000

[54] ANILINE POLYMER ELECTRODE MATERIAL AND SECONDARY CELL

[75] Inventors: Kenichi Kawase; Yoshinori Inoue, both of Tokyo; Michiko Komiyama, Saitama; Mitsuhiro Mori, Tokyo; Yasushi Oura, Chiba; Katsuhiko Naoi, Tokyo, all of Japan

[73] Assignee: Yazaki Corporation, Tokyo, Japan

[21] Appl. No.: 08/921,801

[22] Filed: Sep. 2, 1997

[51] Int. Cl.$^7$ ..................................... C08G 75/00
[52] U.S. Cl. .................... 528/373; 528/374; 429/213; 429/122; 564/305
[58] Field of Search .................. 528/373, 374; 429/213, 122; 564/305

[56] References Cited

U.S. PATENT DOCUMENTS 4,833,048   5/1989   Dejonghe et al. .................. 429/104

FOREIGN PATENT DOCUMENTS 5-74459   3/1993   Japan .

OTHER PUBLICATIONS

Chem Abstracts: 129:333360 "Ehiodianiline Polymers Electrode Materials, and Secondary Batteries" 1998.
129:124820 "A New Polymer Cathode—Conducting Polymer Inter Connected with Sulfur—Sulfur Bonds" Katsihiko et al 1998.
137:2361656 "Elactro Chemistry of Poly(2,2'–Ditliodiamiline): A New Das of High Energy Conducting Polymer Interconnected Wile S—S Bonds" Katuihko et al. 1997.
127:150904 "Electrochemistry of Poly(2,2'–Disthiodianiline): C Newclass of High Energy Conductivy Polymer Interconnect Wile S—S Bonds" Katsihiko et al 1997.

*Primary Examiner*—Duc Truong
*Attorney, Agent, or Firm*—Armstrong, Westerman, Hattori, McLeland & Naughton

[57] ABSTRACT

An aniline polymer having structural Formula I:

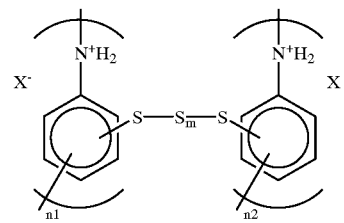

Formula I wherein both n1 and n2 are integers of 2 or more, m is an integer of 0 or more and X$^-$ is any anion. A substance for use in an electrode must be an aniline polymer having preferably two or more serial S—S linkages, such as "S—S—S", "S—S—S—S" and the like, consisting of sulfur. By having such structures, the substance, when used as an electrode active material, serves to improve capacity considerably as compared with other conventional electrode active materials.

4 Claims, 3 Drawing Sheets

Raman Shift/cm⁻¹

ANILINE POLYMER ELECTRODE MATERIAL AND SECONDARY CELL

BACKGROUND OF THE INVENTION

1. Field of the Invention

The present invention relates to a new aniline polymer and to materials for an electrode and a secondary cell comprising the new aniline polymer.

2. Description of the Prior Art

In recent years, transportability of communication and office automation (OA) equipments has been advanced and competition to make them lightweight and small size is becoming fierce. It has also been requested to improve the efficiency of a secondary cell used as a power source in various equipments, or a power source for an electric car and the like.

In response to these demands, secondary cells using new materials for an electrode have been developed. Among them, attention is drawn to materials for electrodes comprising a disulfide compound because of its comparatively high energy density (as disclosed in U.S. Pat. No. 4,833,048, etc.).

In such a disulfide compound to be used as an electrode material, there is a disulfide linkage containing two sulfur elements between groups consisting of two organic substances (R—S—S—R'). The S—S linkage is cleaved by supply of two electrons through electrolytic reduction and becomes 2 (R—S⁻·M⁺) by being bound to cations or protons (M⁺) in electrolytes, and its original linkage form R—S—S—R is restored at the time of electrolytic oxidation, emitting two electrons. In the secondary cell using said material, it is expected that an energy density of more than 150 Wh/kg, which is as good as that of other conventional secondary cells, will be achieved.

However, a report made by inventors of said United States Patent in J. Electrochem Soc., Vol. 136, No. 9, pp 2570–2575 (1989) has revealed that a speed of electron mobility in an electrode reaction in such secondary cells composed of disulfide compounds is extremely slow, which raises problems of making it difficult to take out a large electric current sufficiently adaptable for practical use at approximately a room temperature, thus restricting its use such that an ambient temperature should be 60° C. or above.

Thereafter, in order to improve such a secondary cell composed of disulfide compounds for taking out a large electric current therefrom, as disclosed in a Japanese Patent Application Laid Open No. 5-74459, a material for an electrode employing organic compounds which have a disulfide group in combination with a conducting polymer, such as polyaniline, has been proposed.

In the technology using above-materials, however, though an increase of reaction rate has been achieved, no increase of energy density has been realized.

To overcome such defects in the prior art, some materials for an electrode composed of polysulfide compounds having serial sulfide linkages have been proposed by inventors of the present invention. However, it was found that a decrease in discharging capacity of the electrode using above-described materials has taken place due to a loss of sulfur from an oxidation/reduction through the repetition of charging and discharging of the cell, and therefore a proper means to prevent such a decrease have been sought.

SUMMARY OF THE INVENTION

It is therefore an object of the present invention to provide an excellent substance which eliminates the problems encountered with the prior art when used as a material for an electrode in secondary cells and realizes a secondary cell having a high energy density with less decrease in capacity upon the repetition of charging and discharging.

According to one aspect of the present invention, a material for an electrode to solve said problems is an aniline polymer having structural Formula I:

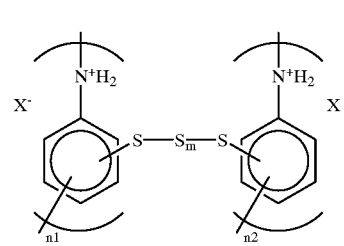

Formula I wherein both n1 and n2 are integers of 2 or more, m is an integer of 0 or more and X⁻ is of any anion, all of which are applicable to other formula as well. However, if there are seven serial S—S linkages in a compound, such compound is practically unusable since sulfur is separated as a stable simple substance.

The aniline polymer having structural Formula I can be used as an electrode active material and constitutes a secondary cell when used together with an opposed electrode and electrolytes.

According to another aspect of the present invention, a material for an electrode to solve said problems is an aniline polymer having structural Formula II:

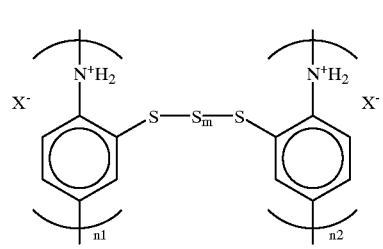

Formula II wherein both n1 and n2 are integers of 2 or more, m is an integer of 0 or more and X⁻ is of any anion.

An aniline polymer having structural Formula II can also be used as an electrode active material and can constitute a secondary cell as well, when used together with a opposed electrode and electrolyte.

DESCRIPTION OF THE PREFERRED EMBODIMENTS

Figure 1:
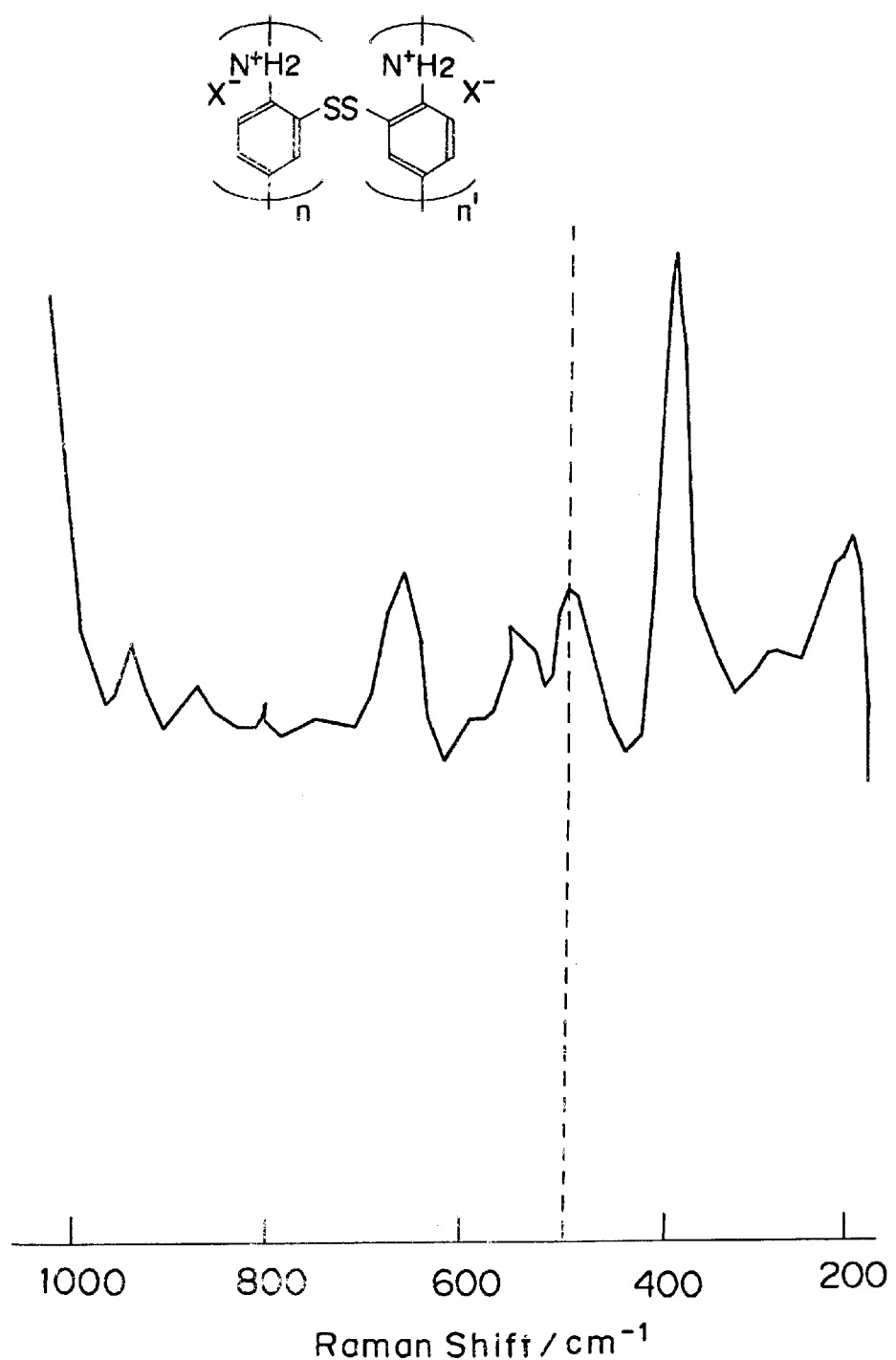
FIG. 1 shows a Raman spectrum of dithiodi(2 aniline) polymer by surface-enhanced Raman spectrometry (SERS)

A substance of the present invention must be an aniline polymer. A structure of such aniline polymer exhibits a polyaniline-type conductivity thereby decreasing an internal resistance thereof when the material is used as an electrode in a secondary cell and also allowing efficient utilization of charged energy accordingly.

As shown in the Formula II, when each imino group is disposed in parallel in the structure, molecular weight of the aniline polymer can be made larger, thereby allowing internal resistance to be decreased efficiently. Such aniline polymer having structural Formula II can also be used as an electrode active material and can constitute a secondary cell as well, when used together with a opposed electrode and electrolyte.

The aniline polymer of the present invention has preferably two or more serial S—S linkages, such as "S—S—S", "S—S—S—S" and the like, consisting of sulfur. By having such structures, the substance, when used as an electrode active material, serves to improve capacity considerably as compared with other conventional electrode active materials.

Furthermore, the aniline polymer of the present invention has a "=N$^+$H$_2$" group. If such an aniline polymer is used as an electrode active material, sulfur(II) ions emitted after the breakage of the sulfide linkage of the aniline polymer during discharging operation are captured by the "=N$^+$H$_2$" group having a cationic property existing in the vicinity of the sulfur(II) ion, thus enabling the original sulfide linkage or polysulfide linkage (—S—Sm—S—) to be easily formed again during charging operation. In this way, even if the charging and discharging are repeated, since a loss of sulfur from an oxidation/reduction system can be prevented from causing, there is provided an excellent secondary cell with a very small decrease in charging and discharging capacity.

In the Formula I and II, X$^-$ represents any anion. However, when this substance is used as a material for an electrode in alkaline secondary cells, the anion represented by X$^-$ in the Formulas I and II should be anions of salts that can be used as an electrolyte in alkaline secondary cells (i.e., said anion includes the same kind of anion as that of salt used for the electrolyte. Hereinafter, both of these two kinds of anions shall be called "electrolytic anion"). In other words, after removing any anion other than that used for electrolyte by chemical washing, the anion should be substituted by an electrolytic anion that can be used for electrolyte. However, if said any anion is an electrolytic anion of the electrolyte from the beginning, the process of such substitution is not required.

Furthermore, it has been considered that, if an aniline polymer having a disulfide linkage therein being free from a fear of said loss of sulfur from an oxidation/reduction system is used in secondary cells, there is a little decrease in capacity. However, an unexpected result is derived from actual repeated operations of charging and discharging such that decrease in capacity of a secondary cell using the aniline polymer having the disulfide linkage is quicker than that of secondary cells using an aniline polymer having a trisulfide linkage or tetrasulfide linkage which has a probability of loosing sulfur from the oxidation/reduction system.

Reasons for the above unexpected results can be explained as follows. In case of a system without elimination of sulfur, the "=N$^+$H$_2$" group is doped with electrolytic anions such as perchloric acid ions in the electrolyte and, as a result, concentration of electrolyte is decreased and therefore internal resistance is raised, resulting in a decrease of charging and discharging capacity.

On the other hand, sulfur liberated from the polysulfide linkage is bound to lithium ions in the neighborhood to form "LiS$^-$" (a lithium sulfur anion). It is also considered that, because the size of this anion is smaller than that of anions of a perchloric acid ion derived from the electrolyte, the "=N$^+$H$_2$" group is speedily doped with such electrolytic anion, thereby preventing the concentration of electrolytic anions from decreasing, thus resulting in the prevention of the decrease in charging and discharging capacity.

Moreover, the aniline polymer of the present invention can be obtained, for example, by a method wherein an aminobenzenethiol polymer is prepared first and, after its disulfide being obtained by a known means (e.g., by an iron sulfate (II)) or its polysulfide being obtained by reacting with sulfur dichloride or disulfur dichloride, it is doped with an electrolytic anion, or by a method wherein, after disulfide of an aminobenzenethiol polymer doped with electrolytic anions being obtained by using an iron sulfate as a catalyst or polysulfide of the aminobenzenethiol polymer doped with electrolytic anions being obtained by reacting with sulfur dichloride or disulfur dichloride, it is polymerized. Also, the doping of the electrolytic anion can be performed at any time other than exemplified above. Further, it is possible in another method wherein the polymer is doped at first with any anion other than the electrolytic anion, then the doping of the electrolytic anion can be also performed after chemically removing the previously doped anions. In any case, a method is properly selected by taking into an account of high yield, ease of reaction (avoidance of steric hindrance) and other considerations. In addition, in above procedures, if the sulfur dichloride is employed, a linkage of an even number of S (sulfur) is formed while, if the sulfur chloride is employed, a linkage of an odd number of S (sulfur) is formed.

When an electrode material is fabricated, an electroconductive material can be used in combination therewith in order to improve the effect of the present invention. That is, a material which is normally used to impart electroconductivity such as furnace black and the like can be utilized. A commercially available conductivity imparting material called Ketchen Black has high conductivity and handlerability. Further, in view of workability in mixing, it is desirable for the conductivity imparting material to be ground into powder.

The aniline polymer of the present invention can be mixed, if necessary, with a conductivity imparting material and a salt to form an electrolyte, for manufacturing an electrode by pressure forming. Further, by dispersing the aniline polymer in an appropriate solvent together with the conductivity imparting material and by turning it into a gelled state with the application of a gelling agent, it is possible to produce a good electrode material having high flexibility and handlerability.

An electrolytic solution to be used in a process of assembling secondary cells is prepared by combining an organic solvent with an electrolyte. Any organic solvent and/or electrolyte can be used so long as it can be applicable to conventional nonaqueous solvent secondary cells. The organic solvents, such as a propylene carbonate, ethylene carbonate, 1,2-methoxyethane, 1,2-diethoxyethane, γ-butyrolactone, tetrahydrofuran, 2-methyltetrahydrofuran, 1,3-dioxolane, 4-methyl-1,3-dioxolane, diethyl ether, sulfolane, acetonitrile, propionitrile, anisole and the like, can be used in a state of simple substance or by mixing thereof.

In the case of a lithium type secondary cell, LiPF$_6$, LiClO$_4$, LiAsF$_6$, LiBF$_4$, LiCF$_3$SO$_3$, etc. are usable as the electrolyte. These substances are dissolved in said organic solvents so as to provide a proper concentration for preparing an electrolyte. When thus provided electrolytes are used, above mentioned electrolytic anions will be PF$_6^-$, ClO$_4^-$, AsF$_6^-$, BF$_4^-$, CF$_3$SO$_3^-$.

Further, these electrolytes can be used as gelled electrolytes (so called solid electrolytes), by adding a gelling agent to the solution wherein they are dissolved. Since these gelled electrolytes are excellent in flexibility and processability, they are suitable for manufacturing cylindrical secondary cells. Since such gelled electrolyte also functions as a separator between electrodes, it is possible to form secondary cells compact and lightweight accordingly. By gelling both a positive electrode and electrolyte, secondary cells being free from leakage of liquid can be realized.

In the fabrication of a secondary cell, an electrode of the kind that has been used as a negative electrode in a conventional secondary cell can also be used. That is, such electrode includes metal lithium, lithium-aluminum alloy or intercalation compounds of lithium and graphite or carbon.

Since a secondary cell is formed by combining the positive electrode, electrolytic solution and negative electrode as describe above, they can be applicable to such secondary cell regardless of its shape such as a flat type, cylindrical type or square type.

EXAMPLES

Examples and experimental comparisons will be hereinafter described. A process that would cause any problems if it were carried out in an atmosphere including air or water was implemented under an argon atmosphere and at a room temperature unless otherwise specified.

A perchloric acid ion was selected as an electrolytic anion and a dithiodi(2-aniline) polymer was used in the comparative example.

Example 1
[Synthesis of Dithiodi(2-aniline) Polymer]

3.0 g (12 mmol) of dithiodi(2-aniline)(commercially available), 150 ml of acetonitrile and 20 g (12 mmol) of 60 weight % of a perchloric acid were entered in a flask of 1000 ml and, then, a water solution of iron(II) sulfate provided by dissolving 0.067 g of heptahydrate of iron(II) sulfur into 50 ml of water was added while stirring. By continuing the stirring, a hydrogen peroxide solution provided by mixing 1.37 g (12 mmol) of 30 weight % of hydrogen peroxide with 100 ml of water was added slowly for taking one hour.

Then, after continuing the stirring for 24 hours, a grayish black precipitate was obtained. The precipitate was collected by filtration and washed with 100 ml of water and 20 ml of methanol. Then, the precipitate was vacuum dried at a temperature of 80° C. for 3 days, and dithiodi(2-aniline) polymer was obtained.

Example 2
[Synthesis of Trithiodi(2-aniline) Polymer]

12.5 g (0.1 mol) of 2-aminobenzenethiol (product of Aldrich) was dissolved in 800 ml of tetrahydrofuran (product of Kanto Chemical) within a measuring flask of 1000 ml and 0.125 mol of sulfur dichloride (product of Kanto Chemical) was added by dropping slowly while stirring. By stirring a produced precipitate for another 10 minutes to allow it to grow and then the precipitate was sucked and filtered. The thus produced precipitate was fully washed chemically with tetrahydrofuran and vacuum dried to obtain trithiodi(2-aniline).

Then, by following the same manner as in the synthesis of said dithiodi(2-aniline) polymer, with the exception of using 3.4 g (12 mmol) of trithiodi(2-aniline) instead of dithiodi (2-aniline), a trithiodi(2-aniline) polymer was obtained.

Example 3
[Synthesis of Tetrathiodi(2-aniline) Polymer]

12.5 g (0.1 mol) of 2-aminobenzenethiol was dissolved in 800 ml of tetrahydrofuran (product of Kanto Chemical) in a measuring flask of 1000 ml and 0.125 mol of sulfur dichloride (product of Kanto Chemical) was slowly added by dropping while stirring. By stirring the produced precipitate for another 10 minutes to allow it to grow and then the precipitate was sucked and filtered. The thus produced precipitate was fully washed with tetrahydrofuran and vacuum drying was performed to obtain tetrathiodi(2-aniline). Then, in the same manner as in the synthesis of said dithiodi(2-aniline) polymer, with the exception of using 3.8 g (12 mmol) of tetrathiodi(2-aniline) instead of dithiodi(2-aniline), a tetrathiodi (2-aniline) polymer was obtained.

[Molecular Weight of Said Aniline Polymers]

GPC (Gel Permeation Chromatography) analysis of said aniline polymers has be implemented. According to this analysis, a molecular weight of each aniline polymer is less than about 3500. It is considered that the reason for such low molecular weight is originated in steric hindrance and the like of said substances. It is, therefore, expected that the molecular weight can be made larger by copolymerization of aniline and substituted aniline.

[Results of Elementary Analysis and Raman Spectrum of the Aniline Polymers]

Figure 2:
FIG. 2 shows a Raman spectrum of trithiodi(2 aniline) polymer by surface-enhanced Raman spectrometry (SERS)
Figure 3:
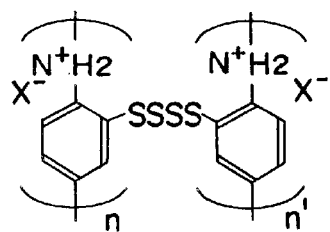
FIG. 3 shows a Raman spectrum of tetrathiodi(2 aniline) polymer by surface-enhanced Raman spectrometry (SERS).
Figure 3:
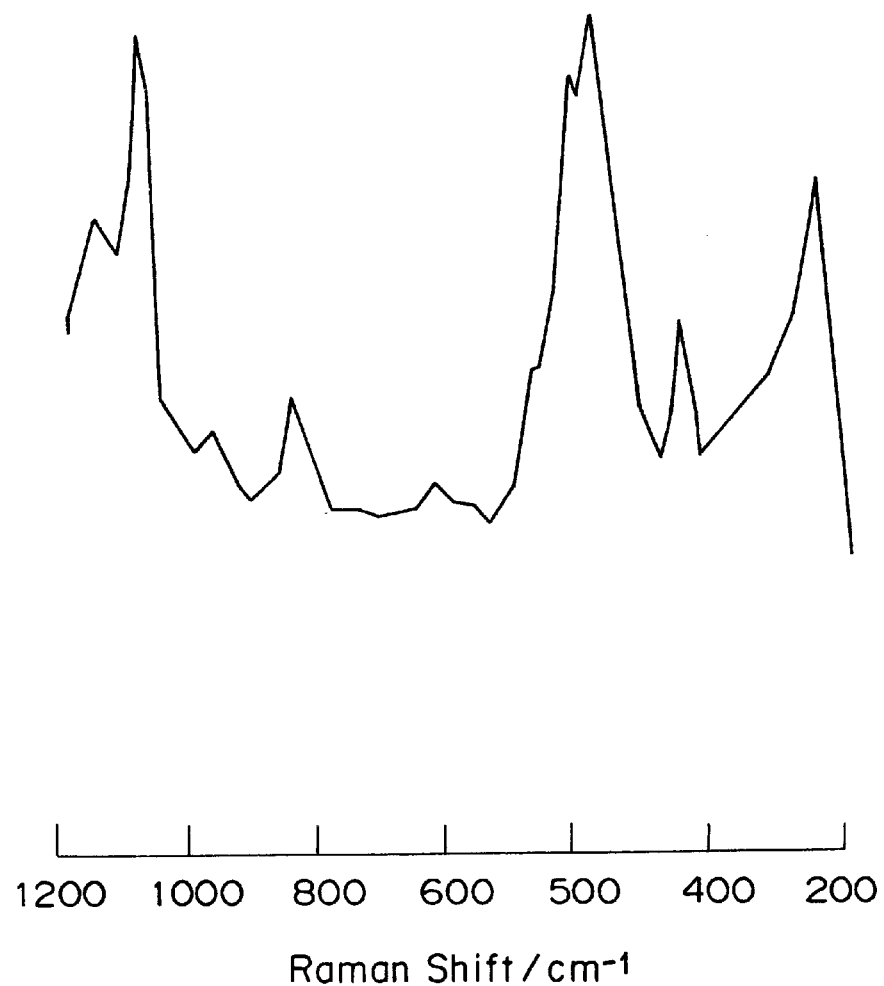

An elementary analysis (CHNS) of said aniline polymers was executed and their FT-Raman spectra were investigated. The results are shown in Tables 1–3 and FIGS. 1–3 respectively. From these results, it has been confirmed that the aniline polymers have disulfide, trisulfide and tetrasulfide linkages respectively.

[Evaluation of Polymers as Electrode Material for Batteries]
(Fabrication of Positive Electrode)

One of said three synthesized active polymers, acetylene black, lithium perchlorate and acetonitrile were mixed with a rate of 2.0:0.3:0.33:0.77 to make a slurry and, after vacuum drying at a temperature of 80° C. for 5 hours. The resultant solid was then crushed into a fine powder. Thus obtained powder is pressure formed into a disk plate of 14 mm in diameter and 0.1 mm in thickness, and then vacuum dried at a temperature of 80° C. for 24 hours for fabricating a positive electrode.

COMPARATIVE Example
[Fabrication of Positive Electrode Using Organic Compounds Having Disulfide Group in Combination with Conducting Polymers such as Polyaniline]

For comparing with the present invention, an electrode material made of an organic compound having a disulfide group in combination with a conducting polymer such as polyaniline was used.

That is, the electrode was fabricated in accordance with Japanese Patent Application Laid Open No. 5-74459.

(1) Oxidative polymerization of 2-mercapto-2-thiazoline (preparation of dimer)

60 g (0.5 mol) of 2-mercapto-2-thiazoline was dissolved in 100 ml of dimethyl sulfoxide. Oxygen was blown into the solution which then was left at a room temperature for a whole day and night (24 hours) to perform oxidative polymerization. Thus obtained reacted solution was treated by a partition thin layer chromatography and then 48 g (0.2 mol) of the intended dimer of 2-mercapto-2-thiazoline was obtained.

(2) Fabrication of composite electrode made of dimer of 2-mercapto-2-thiazoline and polyaniline The dimer of 2-mercapto-2-thiazoline obtained in the above process (1) was added to a solution containing 0.5M Na$_2$SO$_4$ (adjusted to pH=1) and 0.1M aniline for making the dimer of 2-mercapto-2-thiazoline to have a concentration of 10 mmol/l. This solution was electrolyzed at a fixed potential of 1.2 to 1.5V against a potential of a saturated calomel reference electrode to form a composite film of polyaniline-2-mercapto-2-thiazoline dimer, which has a thickness of approximately 20 μm and a fibril configuration, on a graphite electrode.

(Fabrication of Negative Electrode)

A lithium foil having 0.2 mm in thickness was punched with a diameter of 15 mm for use as a negative electrode.

(Preparation of Polymer Gel Electrolyte)

1.5 g of fine powder consisting of polyacrylonitrilemethylacrylate copolymer (with average molecular weight of 100,000) and a solution, which was prepared by dissolving lithium perchlorate in 10 ml of solvent containing an equal volume of ethylene carbonate and propylene carbonate so that the concentration of the lithium perchlorate becomes 1 mol/l, were mixed and dispersed uniformly at a temperature of 120° C. to turn into a sol. Thus formed sol was developed on a glass Petri dish and was left for a whole day and night to produce a gel film, which was punched to form a disk-like film having a diameter of 16 mm and used it as a polymer solid electrolyte. This also serves as a separator in the electrolytic secondary cell.

(Assembling of Battery)

By mounting a positive electrode on one surface of said polymer solid electrolyte and that a negative electrode on the other surface thereof and by accommodating thus formed assembly stainless cases (2016 case), three kinds of secondary cells A, B and C containing aniline polymers described in Examples 1–3 as active materials were formed. Further, a secondary cell D with a positive electrode consisting of an organic compound having a disulfide group together with a conductive polymer such as polyaniline was also formed.

(Evaluation of Battery)

Evaluation of these secondary cells was performed as follows. In the test, charging was performed by supplying a current of 0.75 mA (0.5 mA/cm$^2$ to a positive electrode) under current limiting conditions until a secondary cell voltage reaches to 4.5V and discharging was carried out at a current of 0.75 mA until the secondary cell voltage becomes 2.0V.

The results have shown that an initial discharge capacity of the secondary cell A using dithiodi(2-aniline) polymer as an electrode active material was 200 mAh/g per a positive electrode and, even after 100 times repetition of charging and discharging, its discharge capacity was 130 mAh/g per a positive electrode, which maintained about 75% of its initial discharge capacity of 200 mAh/g per a positive electrode.

The secondary cell B using trithiodi(2-aniline) polymer as an electrode active material was 230 mAh/g per a positive electrode and, even after 100 times repetition of charging and discharging, its discharge capacity was 210 mAh/g per a positive electrode, which maintained about 90% of its initial discharge capacity.

Moreover, the secondary cell C using tetrathiodi(2-aniline) polymer as an electrode active material, even after 100 times repetition of charging and discharging, its discharge capacity was 240 mAh/g per a positive electrode, which maintained about 95% of its initial discharge capacity of 250 mAh/g per a positive electrode.

On the other hand, a secondary cell D with a positive electrode consisting of an organic compound having a disulfide group together with a conductive polymer such as polyaniline was a discharge capacity of less than 10% of its initial capacity after 50 times repetition of charging and discharging and therefore further experiments were not carried out.

Thus, an aniline polymer of the present invention, when used for electrodes in a secondary cell, is an excellent substance for providing high energy density and showing only very small decrease in capacity even after repetition of charging and discharging.

What is claimed is:

1. An aniline polymer having structural Formula I:

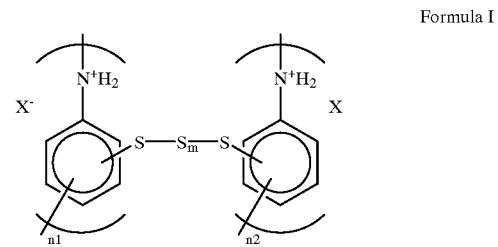

Formula I where, both n1 and n2 are integers of 2 or more, m is an integer of 1 or more and X$^-$ is any anion.

2. The aniline polymer as defined in claim 1, wherein said aniline polymer has structural Formula II:

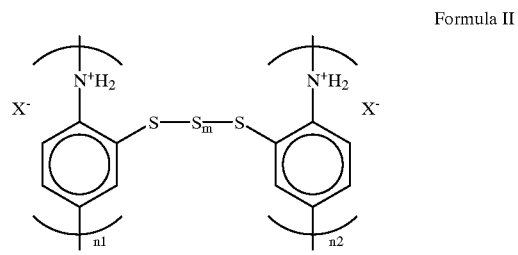

Formula II where, both n1 and n2 are integers of 2 or more, m is an integer of 1 or more and X$^-$ is an anion.

3. The aniline polymer as defined in claim 1, wherein said X$^-$ is an anion of salt to be used as an electrolyte in an alkaline secondary cell.

TABLE 1

Results of CHNS analysis of dithiodi(2-aniline) polymer

|  | C | H | N | S |
|---|---|---|---|---|
| Weight (mg) | 1.096 | 0.074 | 0.211 | 0.459 |
| Percent by weight | 59.56 | 4.02 | 11.48 | 24.94 |
| Composition ratio | 12.1 | 9.8 | 2.0 | 1.9 |

TABLE 2

Results of CHNS analysis of trithiodi(2-aniline) polymer

|  | C | H | N | S |
|---|---|---|---|---|
| Weight (mg) | 0.999 | 0.067 | 0.193 | 0.661 |
| Percent by weight | 52.04 | 3.51 | 10.04 | 34.41 |
| Composition ratio | 12.1 | 9.8 | 2.0 | 3.0 |

TABLE 3

Results of CHNS analysis of tetrathiodi(2-aniline) polymer

|  | C | H | N | S |
|---|---|---|---|---|
| Weight (mg) | 0.930 | 0.063 | 0.181 | 0.806 |
| Percent by weight | 46.97 | 3.20 | 9.13 | 40.70 |
| Composition ratio | 12.0 | 9.8 | 2.0 | 3.9 |

4. The aniline polymer as defined in claim 2, wherein said $X^-$ is an anion of salt to be used as an electrolyte in an alkaline secondary cell.

* * * * *